May 26, 1925.
W. E. PHILLIPS
HOSE COUPLING
Filed June 16, 1923
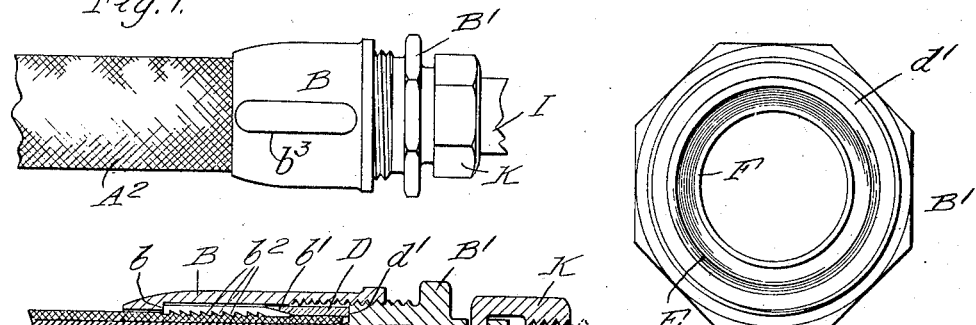
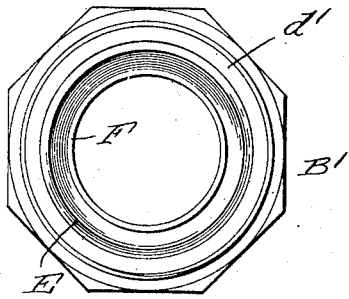
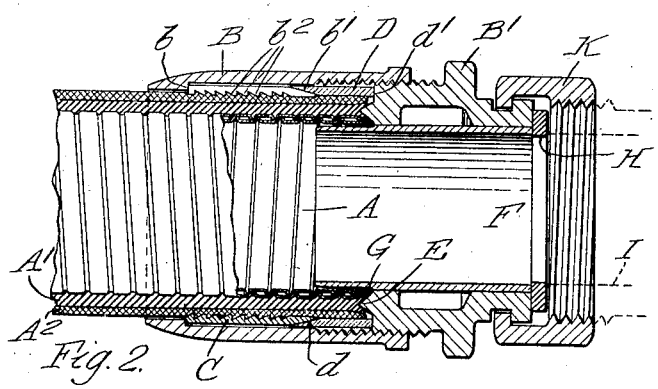
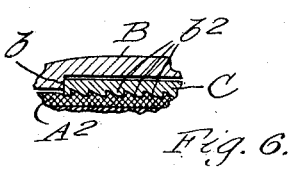
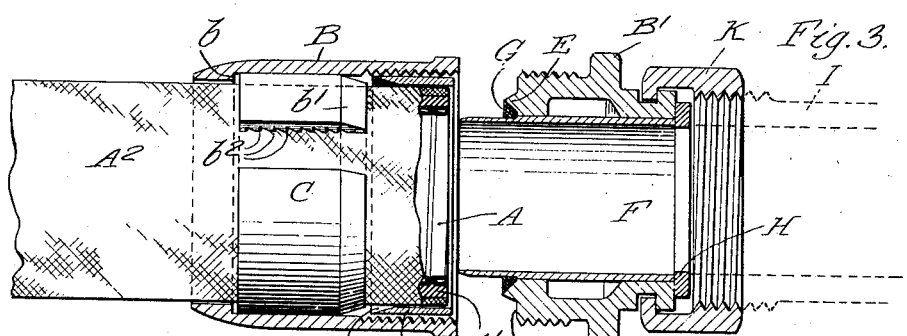
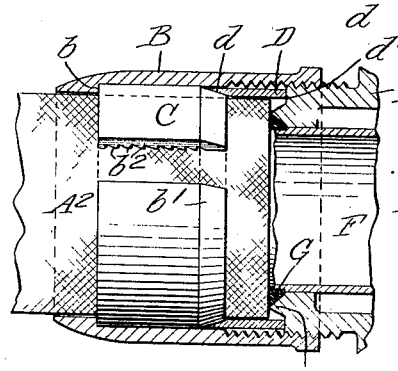
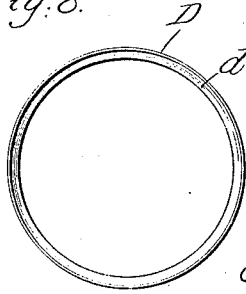
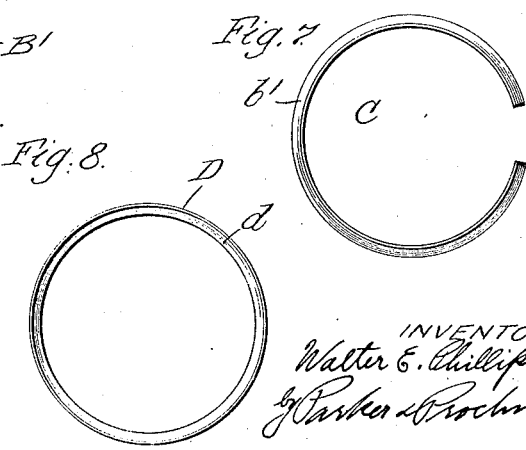
INVENTOR.
Walter E. Phillips
by Parker & Brochman,
ATTORNEYS.

Patented May 26, 1925.

1,539,327

UNITED STATES PATENT OFFICE.

WALTER E. PHILLIPS, OF CLEVELAND, OHIO, ASSIGNOR TO INTERNATIONAL METAL HOSE COMPANY, INC., OF CLEVELAND, OHIO.

HOSE COUPLING.

Application filed June 16, 1923. Serial No. 645,806.

*To all whom it may concern:*

Be it known that I, WALTER E. PHILLIPS, a subject of the King of Great Britain, residing at Cleveland, in the county of Cuyahoga and State of Ohio, have invented a new and useful Improvement in Hose Couplings, of which the following is a specification.

This invention relates to couplings of the kind adapted particularly for use in connection with covered metal hose having an inner flexible metal tube covered with rubber and fabric, or analogous materials.

In couplings for metal hose, difficulty has sometimes been experienced in constructing the coupling so that when the same is applied to the hose, the tightening of the coupling will cause the gripping of the exterior of the hose and the seating of a sealing portion of the coupling to take place simultaneously. One of the objects of this invention is to produce a coupling which overcomes this difficulty so that the gripping and sealing actions of the coupling take place simultaneously.

Other objects of the invention are to produce a coupling of improved construction, which is particularly adapted to cooperate with covered metal hose, and which is so constructed as to produce a joint with the hose, which when once tightened, will not tend to loosen, due to the use of the hose; also to produce a coupling of this kind which can be easily applied to a hose, which is so constructed as to protect the joints between the coupling and the hose against the action of a liquid flowing through the coupling; also to improve the construction of couplings of this kind in the other respects hereinafter specified.

In the accompanying drawings:

Fig. 1 is a longitudinal view of a coupling embodying my invention, showing the same applied to a metal hose.

Fig. 2 is a central, longitudinal, sectional elevation thereof on an enlarged scale.

Fig. 3 is a similar view thereof, partly in elevation, showing the parts of the coupling in positions to be applied to the end of a metal hose.

Fig. 4 is a similar view showing the parts in their operative positions.

Fig. 5 is an end view of the inner coupling member.

Fig. 6 is a fragmentary section thereof showing the hose gripping member in its gripping position with reference to the exterior of the metal hose.

Figs. 7 and 8 are end views of the two rings comprising the gripping means for attaching the coupling to the exterior of the metal hose.

The covered metal hose or tubing shown in the drawings with which the coupling cooperates, includes an inner, flexible metal hose or tube A of well known construction, a layer of rubber A' secured about the outer face thereof, and a layer $A^2$ of fabric or other covering material which forms a protective covering for the hose.

The coupling includes the usual two coupling members having a threaded engagement with each other, B representing one of the coupling members which is arranged about the end of the hose and which will hereinafter be referred to as the outer coupling member, and B' represents the other coupling member which has the usual threaded engagement with the outer coupling member and which is adapted to abut against the end of the hose. The coupling member B' will hereinafter be called the inner coupling member. Within the outer coupling member are arranged the means for securing the coupling to the end of the hose, and the outer coupling member is provided with a shoulder $b$ which is adapted to engage the end of a split ring gripping member C. The opposite end of the split ring gripping member C is provided with a bevelled or tapering external face $b'$. The inner face of this member C is preferably provided with flutes or annular ridges $b^2$ which are adapted to embed themselves into the fabric of the hose when the split ring C is contracted. The gripping member C in the construction shown is made of a single piece, but it will be understood that the ring may be made of a plurality of pieces or sections if desired. The outer coupling member is preferably provided with longitudinal ribs or projections $b^3$ on the outer face thereof which are adapted to engage with a wrench or other tool when turning the coupling members relatively to each other.

The gripping member or split ring C is adapted to be contracted to grip the outer face of the hose by means of a ring D having a bevelled inner face $d$ corresponding with the bevelled outer face b' of the gripping member. The gripping member and the contracting ring D are adapted to be moved toward each other by the inner and outer coupling members, and the inner coupling member is therefore provided with an annular shouldered portion d' adapted to bear against the ring D. It will be readily understood that as the coupling members are turned relatively to each other the contracting ring D is moved toward the gripping member C to cause the cooperating bevelled faces of the gripping member and contracting ring to engage, to contract the gripping member, and since the gripping member C is held against endwise movement by means of the shoulder b, the contraction of the gripping member will be in a direction substantially radial with reference to the hose. This contracting movement of the gripping member, therefore, causes no relative movement of the hose with reference to the outer coupling member during the tightening action of the gripping member.

The inner coupling member is provided with an annular seating portion E which is preferably formed integral with this coupling member and which is substantially of V-shaped cross section and is of such diameter as to cooperate with the rubber covering of the hose.

The coupling described is so designed that the seating portion E of the inner coupling member does not penetrate into the rubber layer of the hose until the gripping member C has begun to tighten on the outer surface of the hose. Consequently, no skill is required to place the coupling on the end of the hose, the parts of the coupling being placed thereon as shown, for example, in Fig. 3, the only precaution necessary being to insert the hose far enough through the outer coupling member and the gripping means arranged therein. The inner coupling member is then placed against the end of the hose and the outer coupling member may be moved toward the inner coupling member so as to permit the threads of these two members to engage. The engagement of the seating portion E with the end of the rubber layer of the hose will cause a relative movement between the hose and the outer coupling member until the inner member has been screwed into the outer coupling member sufficiently to cause the two coupling members to engage the two parts of the gripping device and move the same into operative relation, in which their bevelled faces are in engagement. The parts are then in the position shown in Fig. 4, and upon further turning of the inner coupling member, the gripping member C will engage the outer surface of the hose. As soon as the gripping member holds the hose with sufficient force to prevent further relative movement between the hose and the outer coupling member, the seating portion E will also penetrate into the rubber layer, as shown in Fig. 2, so that the clamping of the coupling on the hose and the seating of the member E on the rubber will take place simultaneously, thus insuring a tight fastening of the coupling member on the hose as well as the formation of a tight joint between the inner coupling member and the rubber layer of the hose.

F represents an inner tube made of comparatively thin material, which is preferably secured to the interior of the inner coupling member. This may be done in any suitable manner, for example, by means of a driving fit between the tube F and the inner coupling member. This tube extends slightly beyond the seating end of the inner coupling member and is preferably arranged flush with the other end thereof. The projecting end of the tube F is adapted to enter inside of the metal portion A of the hose, thus forming an annular groove or depression in the end of the inner coupling member between the seating portion E thereof and the tube F, and preferably this annular groove is filled with a suitable cement G of the kind not affected chemically by the liquid for which the hose and coupling are intended to be used. The projecting end of the tube F also has the advantage of protecting the cement against the abrasive action or washing out by the liquid flowing through the hose and coupling. By the use of a tube of this kind, another advantage results, namely that no particular care need be taken to make sure that the inner coupling B', which is generally made of cast metal, contains any pores or crevices through which liquid may escape, since one end of the tube F has a tight joint with the hose, due to the gasket or cement G, and the other end of the tube engages a gasket or washer H, which in turn is engaged by the nozzle or other part I indicated in dotted lines in Figs. 2 and 3. Consequently, the liquid flowing through the hose and coupling does not come into contact with the inner coupling member B'. The nozzle I may be held in place on the coupling member B' in any desired manner, for example, by means of a sleeve or collar K swivelled on the inner coupling member and having an internal thread adapted to engage with the nozzle or other part. The tube F is made of thin metal so that it causes practically no contraction of the flow passage through the coupling member.

The coupling described has the advantage that the gripping action thereof on the exterior of the hose and the seating action of the inner coupling member take place simultaneously so as to insure a liquid tight joint between the coupling and the hose and a secure gripping of the coupling member on the hose. By providing square shoulders $b$ on the outer coupling member B, there is no relative movement between the outer coupling member and the gripping means during the gripping operation, and consequently there is no tendency of a coupling to become loosened on the hose during the continued use of the hose, since any pull on the coupling will not tend to cause the gripping member C to penetrate further into the outer surface of the hose and thus cause a relative movement between the hose and coupling member, which in turn would cause the inner coupling member to move from its seat and produce a leak. The provision of the inner tube F insures a liquid tight joint between the hose and the part to be attached thereto, and protects the cement joint against the abrasive action of the liquid flowing through the hose, and also makes it possible to use comparatively inexpensive cast metal on the inner and outer coupling members, since neither of these members is required to be liquid tight.

I claim as my invention:—

1. A coupling for covered metal hose including two coupling members, one of which is arranged around the hose and is provided with an internal stop shoulder, a contractible gripping member having one end adapted to engage said shoulder and having its other end bevelled, and a contracting ring having a bevelled face adapted to cooperate with the bevelled end of said gripping member, said other coupling member having an inner sealing part adapted to engage the end of said hose and a part surrounding said sealing part and adapted to move said contracting ring toward said gripping member.

2. A coupling for covered metal hose including two coupling members, one of which is arranged around the hose and is provided with an internal stop shoulder, a contractible gripping member having one end adapted to engage said shoulder and having its other end bevelled, a contracting ring having a bevelled face adapted to cooperate with the bevelled end of said gripping member, said other coupling member having a shouldered portion adapted to engage the end of said hose to form a tight joint therewith and to engage said contracting ring to move the same toward said gripping member, and a thin tube secured to said other coupling member and extending into said hose to reduce the resistance to the flow of liquid through said coupling.

3. A coupling for covered metal hose including two coupling members which are adapted to cooperate to secure the coupling to the hose, one of said coupling members having an annular projecting portion at one end thereof adapted to seat against the covering of said hose to form a tight joint, a tube secured in said coupling member and adapted to extend into said hose and a ring of sealing material between said annular projection and said tube for forming a tight joint between said tube and said hose.

4. A coupling for covered metal hose including two coupling members which are adapted to cooperate to secure the coupling to the hose, one of said coupling members having an annular projecting portion at one end thereof adapted to seat against the covering of said hose to form a tight joint, a tube secured in said coupling member and adapted to extend into said hose, a ring of sealing material between said annular projection and said tube for forming a tight joint between said tube and said hose, and means adapted to cooperate with the other end of said tube to prevent liquid from said hose from coming into contact with said coupling members.

5. A coupling for covered metal hose including two coupling members, one of which is arranged around said hose and the other of which abuts against the end of said hose to form a tight joint therewith, means actuated by said coupling members for causing said coupling to grip said hose at the same time that said other coupling member forms a joint with the end of said hose, a tube secured in said other coupling member and extending into said hose, means for forming a tight joint with said extending end of said tube and said hose, and means cooperating with said other end of said tube to prevent liquid from said hose from coming into contact with said coupling member.

WALTER E. PHILLIPS.